US007054957B2

(12) United States Patent
Armitage

(10) Patent No.: US 7,054,957 B2
(45) Date of Patent: May 30, 2006

(54) SYSTEM FOR PROGRAMMING HEARING AIDS

(75) Inventor: Scott T. Armitage, Deephaven, MN (US)

(73) Assignee: Micro Ear Technology, Inc., Plymouth, MN (US)

( * ) Notice: Subject to any disclaimer, the term of this patent is extended or adjusted under 35 U.S.C. 154(b) by 25 days.

(21) Appl. No.: 09/795,829

(22) Filed: Feb. 28, 2001

(65) Prior Publication Data

US 2001/0009019 A1 Jul. 19, 2001

Related U.S. Application Data

(63) Continuation of application No. 09/152,416, filed on Sep. 14, 1998, now Pat. No. 6,449,662, which is a continuation-in-part of application No. 08/782,328, filed on Jan. 13, 1997, now abandoned.

(51) Int. Cl.
*G06F 3/00* (2006.01)
*G06F 13/12* (2006.01)
*H04R 25/00* (2006.01)

(52) U.S. Cl. .............................. 710/8; 710/64; 710/73; 381/68.2; 381/314

(58) Field of Classification Search ................ 381/314, 381/68.2, 315, 323; 710/8, 64, 2, 10, 72, 710/73

See application file for complete search history.

(56) References Cited

U.S. PATENT DOCUMENTS

| | | | | |
|---|---|---|---|---|
| 3,527,901 | A | 9/1970 | Geib | |
| 4,366,349 | A | 12/1982 | Adelman | 179/107 |
| 4,396,806 | A | 8/1983 | Anderson | 179/107 |
| 4,419,544 | A | 12/1983 | Adelman | 179/107 |
| 4,425,481 | A | 1/1984 | Mansgold et al. | 179/107 |
| 4,471,490 | A | 9/1984 | Bellafiore | 381/69 |
| 4,637,402 | A | 1/1987 | Adelman | 128/746 |
| 4,731,850 | A | 3/1988 | Levitt et al. | 381/68.2 |
| 4,791,672 | A | 12/1988 | Nunley et al. | 381/317 |

(Continued)

FOREIGN PATENT DOCUMENTS

DE 4339898 11/1993

(Continued)

OTHER PUBLICATIONS

Anderson, B.A., "A PCMCIA Card for Programmable Instrument Applications", *TECH-TOPIC, reprinted from The Hearing Review*, vol. 4, No. 9, pp. 47-48, (Sep. 1997).

(Continued)

*Primary Examiner*—Chun Cao
(74) *Attorney, Agent, or Firm*—Schwegman, Lundberg, Woessner & Kluth, P.A.

(57) ABSTRACT

A hearing aid programming system with a host computer system including a program for programming a hearing aid. The host computer system includes a first communication interface for sending and receiving control and data signals. A hearing aid programming interface device is connected to the communication interface of the host computer system and includes a second communication interface for sending and receiving control and data signals. The hearing aid programming interface device also includes circuitry for electrically isolating the hearing aid to be programmed from the host computer. The first communication interface may be PCMCIA, USB, RS-232, SCSI or IEEE 1394 interfaces, which are arranged to send and receive serial data and control signals to the hearing aid programming interface device. The first communication interface may also be a wireless communications interface which wirelessly sends and receives control and data signals with the hearing aid programming interface device.

40 Claims, 8 Drawing Sheets

U.S. PATENT DOCUMENTS 4,879,749 A 11/1989 Levitt et al. ............... 381/68.4
4,882,762 A 11/1989 Waldhauer
4,887,299 A 12/1989 Cummins et al. .......... 381/68.4
4,947,432 A 8/1990 Topholm .................. 381/68.2
4,961,230 A 10/1990 Rising ...................... 381/69.2
4,989,251 A 1/1991 Mangold .................. 381/68.2
5,027,410 A 6/1991 Williamson et al.
5,061,845 A 10/1991 Pinnavaia .................. 235/492
5,083,312 A 1/1992 Newton et al. .............. 381/68
5,144,674 A 9/1992 Meyer et al. ................ 381/68
5,197,332 A 3/1993 Shennib ...................... 73/585
5,226,086 A 7/1993 Platt ........................... 381/58
5,276,739 A 1/1994 Krokstad et al. .......... 381/68.2
5,295,191 A 3/1994 Van Vroenhoven ........ 381/68.6
5,303,306 A 4/1994 Brillhart et al. ............. 381/68
5,343,319 A * 8/1994 Moore ....................... 359/152
5,347,477 A 9/1994 Lee ...................... 374/709.11
5,373,149 A 12/1994 Rasmussen ................ 235/492
5,384,852 A 1/1995 Scharen ...................... 381/68
5,387,875 A 2/1995 Tateno ........................ 330/10
5,388,248 A 2/1995 Robinson et al. .......... 395/425
5,390,254 A 2/1995 Adelman ..................... 381/68
5,402,494 A 3/1995 Flippe et al. ............. 381/69.2
5,418,524 A * 5/1995 Fennell ................. 340/825.22
5,420,930 A 5/1995 Shugart, III ............... 381/68.6
5,422,855 A 6/1995 Eslick et al. ................ 365/226
5,434,924 A 7/1995 Jampolsky ................. 381/68.4
5,440,449 A 8/1995 Scheer ....................... 361/686
5,445,525 A 8/1995 Broadbent et al. ............ 439/64
5,479,522 A 12/1995 Lindemann et al. ....... 381/68.2
5,481,616 A 1/1996 Freadman .................... 381/90
5,488,668 A 1/1996 Waldhauer ................ 381/68.4
5,500,902 A 3/1996 Stockham, Jr. et al. .... 381/68.4
5,502,769 A 3/1996 Gilbertson .................. 381/68
5,540,597 A 7/1996 Budman et al. .............. 439/77
5,546,590 A * 8/1996 Pierce ........................ 713/323
5,553,151 A 9/1996 Goldberg .................. 381/68.4
5,553,152 A * 9/1996 Newton ...................... 381/328
5,555,490 A 9/1996 Carroll ....................... 361/686
5,559,501 A 9/1996 Barzegar et al. ............ 340/825
5,561,446 A 10/1996 Montlick .................... 345/173
5,572,683 A 11/1996 Epolite et al. .............. 395/284
5,574,654 A 11/1996 Bingham et al. ........... 364/487
5,581,747 A 12/1996 Anderson ................... 395/551
5,604,812 A * 2/1997 Meyer ........................ 381/314
5,606,620 A * 2/1997 Weinfurtner ................ 381/314
5,615,344 A 3/1997 Corder ....................... 395/309
5,619,396 A 4/1997 Gee et al. ................... 361/686
5,649,001 A * 7/1997 Thomas et al. .......... 379/93.07
5,659,621 A 8/1997 Newton ....................... 381/68
5,664,228 A 9/1997 Mital ......................... 395/882
5,671,368 A 9/1997 Chan et al. ................. 395/282
5,696,970 A 12/1997 Sandage et al. ............ 395/681
5,696,993 A 12/1997 Gavish ....................... 395/882
5,710,819 A 1/1998 Topholm et al. ............ 381/316
5,710,820 A * 1/1998 Martin et al. ............... 381/321
5,717,771 A 2/1998 Sauer et al. ............... 381/68.6
5,721,783 A 2/1998 Anderson ................... 381/328
5,736,727 A 4/1998 Nakata et al. .............. 235/487
5,751,820 A 5/1998 Taenzer ....................... 381/68
5,757,933 A 5/1998 Preves et al. ................. 381/68
5,784,628 A * 7/1998 Reneris ...................... 713/300
5,785,661 A 7/1998 Shennib ...................... 600/559
5,822,442 A 10/1998 Agnew et al. .............. 381/107
5,825,631 A 10/1998 Prchal ........................ 361/790
5,827,179 A 10/1998 Lichter et al. .............. 600/300
5,835,611 A 11/1998 Kaiser et al. ............... 381/321
5,852,668 A 12/1998 Ishige et al. ................ 381/312
5,861,968 A 1/1999 Kerklaan et al. ........... 359/152
5,862,238 A 1/1999 Agnew et al. .............. 381/321
5,864,708 A * 1/1999 Croft et al. .................... 710/1
5,870,481 A 2/1999 Dymond et al. .............. 381/60
5,878,282 A 3/1999 Mital ......................... 395/882
5,887,067 A * 3/1999 Costa et al. .................. 381/81
5,890,016 A * 3/1999 Tso ............................. 710/64
5,916,174 A 6/1999 Dolphin ...................... 600/559
5,929,848 A * 7/1999 Albukerk et al. ........... 345/326
5,987,513 A 11/1999 Prithviraj et al. ........... 709/223
6,009,480 A * 12/1999 Pleso ............................ 710/8
6,016,962 A 1/2000 Nakata et al. .............. 235/486
6,023,570 A * 2/2000 Tang et al. .................... 716/17
6,032,866 A 3/2000 Knighton et al. ........... 235/492
6,041,129 A 3/2000 Adelman .................... 381/328
6,058,197 A 5/2000 Delage ....................... 381/314
6,151,645 A * 11/2000 Young et al. ................. 710/63
6,236,731 B1 5/2001 Brennan et al. ............ 381/316
6,240,192 B1 5/2001 Brennan et al. ............ 381/314
6,347,148 B1 2/2002 Brennan et al.
6,366,863 B1 4/2002 Bye et al. ...................... 702/57
6,389,142 B1 5/2002 Hagen et al. ............... 381/313
6,424,722 B1 7/2002 Hagen et al. ............... 381/314
6,574,342 B1 6/2003 Davis et al. ................ 381/314
6,644,120 B1 11/2003 Braun et al. .................. 73/585
6,707,581 B1 3/2004 Browning ................... 358/473
6,717,925 B1 4/2004 Leppisaari et al. ......... 370/312
2001/0007050 A1 7/2001 Adelman .................... 600/150
2002/0076073 A1 6/2002 Taenzer et al. ............. 381/315

FOREIGN PATENT DOCUMENTS

DE 19541648 5/1997
DE 19600234 7/1997
DE 29905172 7/1999
DE 19815373 10/1999
EP 341902 11/1989
EP 341903 11/1989
EP 342782 11/1989
EP 363609 4/1990
EP 381608 8/1990
EP 448764 10/1991
EP 0537026 4/1993
EP 565279 10/1993
EP 579152 1/1994
EP 632609 1/1995
EP 658035 6/1995
EP 689755 1/1996
EP 742548 11/1996
EP 763903 3/1997
EP 765042 3/1997
EP 789474 8/1997
EP 796035 9/1997
EP 800331 10/1997
EP 805562 11/1997
EP 823829 2/1998
EP 831674 3/1998
EP 853443 7/1998
EP 858180 8/1998
JP 01318500 12/1989
JP 10210541 8/1998
WO WO-8404195 10/1984
WO WO-8701851 3/1987
WO WO-9103042 3/1991
WO WO-9422372 3/1994
WO WO-9425958 11/1994
WO WO-9513685 5/1995
WO WO-9515712 6/1995
WO WO-9602097 1/1996
WO WO-8601671 3/1996
WO WO-09637086 11/1996
WO 96/41498 12/1996
WO WO-9714266 4/1997
WO WO-9714267 4/1997
WO WO-9717819 A1 5/1997
WO WO-9719573 5/1997

| | | |
|---|---|---|
| WO | WO-9723062 | 6/1997 |
| WO | WO-9727682 | 6/1997 |
| WO | WO-9727712 | 7/1997 |
| WO | WO-9731431 | 8/1997 |
| WO | WO-9739537 | 10/1997 |
| WO | WO-9741653 | 11/1997 |
| WO | WO-9802969 | 1/1998 |
| WO | WO-9816086 | 4/1998 |
| WO | WO-9826513 | 6/1998 |
| WO | WO-98/51124 | 11/1998 |
| WO | WO-98/54928 | 12/1998 |
| WO | WO-00/21332 | 4/2000 |

OTHER PUBLICATIONS

Griffing, Terry S., et al., "Acoustical Efficiency of Canal ITE Aids", *Audecibel*,(Spring 1983), pp. 30-31.

Griffing, Terry S., et al.,"Custom canal and mini in-the-ear hearing aids", *Hearing Instruments*, vol. 34, No. 2, (Feb. 1983), pp. 31-32.

Griffing, Terry S., et al., "How to evaluate, sell, fit and modify canal aids", *Hearing Instruments*, vol. 35, No. 2, (Feb. 1984), 3 pgs.

Mahon, William J., "Hearing Aids Get a Presidential Endorsement", *The Hearing Journal*,, (Oct. 1983), pp. 7-8.

Sullivan, Roy F., "Custom canal and concha hearing instruments: A real ear comparison", *Hearing Instruments*, vol. 40, No. 4, (Jul. 1989), 5 pgs.

Sullivan, Roy F., "Custom canal and concha hearing instruments: A real ear comparison Part II", *Hearing Istruments*, vol. 40, No. 7, (Jul. 1989), 6 pgs.

Armitage, Scott, et al., "Microcard: A new hearing aid programming interface", *Hearing Journal*, 51(9), (Sep. 1998), 37-32.

"Microcard PCMCIA Programming Interface", *Internet Site*: www.hearing-aid.com, (2000).

"What Is PCMCIA?", http://pw2.netcom.com/~ed13/pcmcia.html, Internet webpage,(Nov. 14, 1996),3 pgs.

Bye, Gordon J., et al., "Portable Hearing-Related Analysis System", U.S. Appl. No. 10/698,333, Date filed Oct. 31, 2003, 90 pgs.

Clancy, David A., "Highlighting developments in hearing aids", *Hearing Instruments*, (Dec. 1995),2.

Eaton, Anthony M., et al., "Hearing Aid Systems", U.S. Appl. No. 09/492,913, Filed Jan. 20, 2000, 56 pgs.

Hagen, Lawrence T., et al., "Portable System for Programming Hearing Aids", U.S. Appl. No. 10/842,246, Filed May 10, 2004, 53 pgs.

Microaudiometrics Corporation, "Microaudiometrics Corporation Web Page", *Internet Web Page at* http://www.microaud.com, (May 26, 1999),11 pgs.

* cited by examiner

SYSTEM FOR PROGRAMMING HEARING AIDS

CROSS-REFERENCE TO RELATED APPLICATIONS

This application is a continuation of U.S. patent application Ser. No. 09/152,416, filed on Sep. 14, 1998, now, U.S. Pat. No. 6,449,662, which is a continuation-in-part of U.S. patent application Ser. No. 08/782,328, filed on Jan. 13, 1997, now abandoned.

STATEMENT REGARDING FEDERALLY SPONSORED RESEARCH

Not applicable

BACKGROUND OF THE INVENTION

This invention relates generally to a programming system for programmable hearing aids; and, more particularly relates to a hearing aid programming system utilizing a host computer in conjunction with a hearing aid interface device and operates with a well-defined port to the host.

Hearing aids have been developed to ameliorate the effects of hearing losses in individuals. Hearing deficiencies can range from deafness to hearing losses where the individual has impairment of responding to different frequencies of sound or to being able to differentiate sounds occurring simultaneously. The hearing aid in its most elementary form usually provides for auditory correction through the amplification and filtering of sound provided in the environment with the intent that the individual can hear better than without the amplification.

Prior art hearing aids offering adjustable operational parameters to optimize hearing and comfort to the user have been developed. Parameters, such as volume or tone, may easily be adjusted, and many hearing aids allow for the individual user to adjust these parameters. It is usual that an individual's hearing loss is not uniform over the entire frequency spectrum of audible sound. An individual's hearing loss may be greater at higher frequency ranges than at lower frequencies. Recognizing these differentiations in hearing loss considerations between individuals, it has become common for a hearing health professional to make measurements that will indicate the type of correction or assistance that will be the most beneficial to improve that individual's hearing capability. A variety of measurements may be taken, which can include establishing speech recognition scores, or measurement of the individual's perceptive ability for differing sound frequencies and differing sound amplitudes. The resulting score data or amplitude/frequency response can be provided in tabular form or graphically represented, such that the individual's hearing loss may be compared to what would be considered a more normal hearing response. To assist in improving the hearing of individuals, it has been found desirable to provide adjustable hearing aids wherein filtering parameters may be adjusted, and automatic gain control (AGC) parameters are adjustable.

With the development of micro-electronics and microprocessors, programmable hearing aids have become well-known. It is known for programmable hearing aids to have a digital control section which stores auditory parameters and which controls aspects of signal processing characteristics. Such programmable hearing aids also have a signal processing section, which may be analog or digital, and which operates under control of the control section to perform the signal processing or amplification to meet the needs of the individual.

Hearing aid programming systems have characteristically fallen into two categories: (a) programming systems that are utilized at the manufacturer's plant or distribution center, or (b) programming systems that are utilized at the point of dispensing the hearing aid.

One type of programming system for programming hearing aids are the stand-alone programmers that are self-contained and are designed to provide the designed programming capabilities. Examples of the stand-alone programmers are the Sigma 4000, available commercially from Unitron of Kitchenor, Ontario, Canada, and the Solo II available commercially from dbc-mifco of Portsmouth, N.H. It is apparent that stand-alone programmers are custom designed to provide the programming functions known at the time. Stand-alone programmers tend to be inflexible and difficult to update and modify, thereby raising the cost to stay current. Further, such stand-alone programmers are normally designed for handling a limited number of hearing aid types and lack versatility. Should there be an error in the system that provides the programming, such stand-alone systems tend to be difficult to repair or upgrade.

Another type of programming system is one in which the programmer is connected to other computing equipment. An example of cable interconnection programming systems is the Hi Pro, available from Madsen of Copenhagen, Denmark. A system where multiple programming units are connected via telephone lines to a central computer is described in U.S. Pat. No. 5,226,086 to J. C. Platt. Another example of a programming system that allows interchangeable programming systems driven by a personal computer is described in U.S. Pat. No. 5,144,674 to W. Meyer et al. Other U.S. patents that suggest the use of some form of computing device coupled to an external hearing aid programming device are U.S. Pat. No. 4,425,481 to Mansgold et al.; U.S. Pat. No. 5,226,086 to Platt; U.S. Pat. No. 5,083,312 to Newton et al.; and U.S. Pat. No. 4,947,432 to Topholm. Programming systems that are cable-coupled or otherwise coupled to supporting computing equipment tend to be relatively expensive in that such programming equipment must have its own power supply, power cord, housing, and circuitry, thereby making the hearing aid programmer large and not as readily transportable as is desirable.

Yet another type of hearing aid programmer available in the prior art is a program that is designed to install into and become part of a larger computing system. An example of such a plug-in system is available commercially and is known as the UX Solo available from DBC-MIFCO. Hearing aid programmers of the type that plug into larger computers are generally designed to be compatible with the expansion ports on a specific computer. Past systems have generally been designed to plug into the bus structure known as the Industry Standard Architecture (ISA) which has primarily found application in computers available from IBM. The ISA expansion bus is not available on many present-day hand-held or lap top computers. Further, plugging cards into available ISA expansion ports requires opening the computer cabinet and appropriately installing the expansion card.

It can be seen then that the prior art systems do not readily provide for a hearing aid programming system that can be easily affixed to a personal computer such as a lap top computer or a hand-held computer for rendering the entire programming system easily operable and easily transportable. Further, the prior art systems tend to be relatively more expensive, and are not designed to allow modification or enhancement of the software while maintaining the simplicity of operation.

BRIEF SUMMARY OF THE INVENTION

The primary objective of the invention in providing a small, highly transportable, inexpensive, and versatile system for programming hearing aids is accomplished through the use of host computer means for providing at least one hearing aid program, where the host computer means includes at least one uniformly specified expansion port for providing power circuits, data circuits, and control circuits, and a pluggable card means coupled to the specified port for interacting with the host computer means for controlling programming of at least one hearing aid, the programming system including coupling means for coupling the card means to at least one hearing aid to be programmed.

Another primary objective of the invention is to utilize a standardized specification defining the port architecture for the host computer, wherein the hearing aid programming system can utilize any host computer that incorporates the standardized port architecture. In this regard, the personal computer memory card international association (PCMCIA) specification for the port technology allows the host computer to be selected from lap top computers, notebook computers, or hand-held computers where such PCMCIA ports are available and supported. With the present invention, it is no longer needed to provide general purpose computers, either at the location of the hearing health professional, or at the factory or distribution center of the manufacturer of the hearing aids to support the programming function.

Another objective of the invention is to provide a highly portable system for programming hearing aids to thereby allow ease of usage by hearing health professionals at the point of distribution of hearing aids to individuals requiring hearing aid support. To this end, the programming circuitry is fabricated on a Card that is pluggable to a PCMCIA socket in the host computer and is operable from the power supplied by the host computer.

Yet another object of the invention is to provide an improved hearing aid programming system that utilizes standardized drivers within the host computer in this aspect of the invention, the PCMCIA card means includes a card information structure (CIS) that identifies the host computer of the identification and configuration requirements of the programming circuits on the card. In one embodiment, the CIS identifies the PCMCIA Card as a serial port such that standardized serial port drivers in the host computer can service the PCMCIA Card. In another embodiment, the CIS identifies the PCMCIA Card as a unique type of hearing aid programmer card such that the host computer would utilize drivers supplied specifically for use with that card. In another embodiment, the CIS identifies the PCMCIA Card as a memory card, thereby indicating to the host computer that the memory card drivers will be utilized. Through the use of the standardized PCMCIA architecture and drivers, the PCMCIA Card can be utilized with any host computer that is adapted to support the PCMCIA architecture.

Still another object of the invention is to provide a hearing aid programming system that can be readily programmed and in which the adjustment programs can be easily modified to correct errors. In one aspect of the invention, the programming software is stored in the memory of a host computer and is available for ease of modification or debugging on the host computer. In operation, then, the programming software is downloaded to the PCMCIA Card when the Card is inserted in the host computer. In another embodiment, the programming software is stored on the PCMCIA Card in nonvolatile storage and is immediately available without downloading upon insertion of the Card. In this latter configuration and embodiment, the nonvolatile storage means can be selected from various programmable devices that may be alterable by the host computer. In one arrangement, the nonvolatile storage device is electrically erasable programmable read-only memory (EEPROM).

Another objective of the invention is to provide an improved hearing aid programming system wherein the hearing aid programming circuitry is mounted on a Card that meets the physical design specifications provided by PCMCIA. To this end, the Card is fabricated to the specifications of either a Type I Card, a Type II Card, or a Type III Card depending upon the physical size constraints of the components utilized.

Yet another objective of the invention is to provide an improved hearing aid programming system wherein the type of hearing aid being programmed can be identified. In this embodiment, a coupling means for coupling the hearing aid programming circuitry to the hearing aid or hearing aids being programmed includes cable means for determining the type of hearing aid being programmed and for providing hearing aid identification signals to the host computer.

Another embodiment of the hearing aid programming system provides a host computer system including a program for programming a hearing aid. The host computer system includes a first communication interface for sending and receiving control and data signals. A hearing aid programming interface device is connected to the communication interface of the host computer system and includes a second communication interface for sending and receiving control and data signals. The hearing aid programming interface device also includes circuitry for electrically isolating the hearing aid to be programmed from the host computer. The first communication interface may be PCMCIA, USB, RS-232, SCSI or Firewire interfaces, which are arranged to send and receive serial data and control signals to the hearing aid programming interface device. The first communication interface may also be a wireless communications interface which wirelessly sends and receives control and data signals with the hearing aid programming interface device.

These and other more detailed and specific objectives and an understanding of the invention will become apparent from a consideration of the following Detailed Description of the Invention in view of the Drawings.

DETAILED DESCRIPTION OF THE INVENTION

Figure 1:
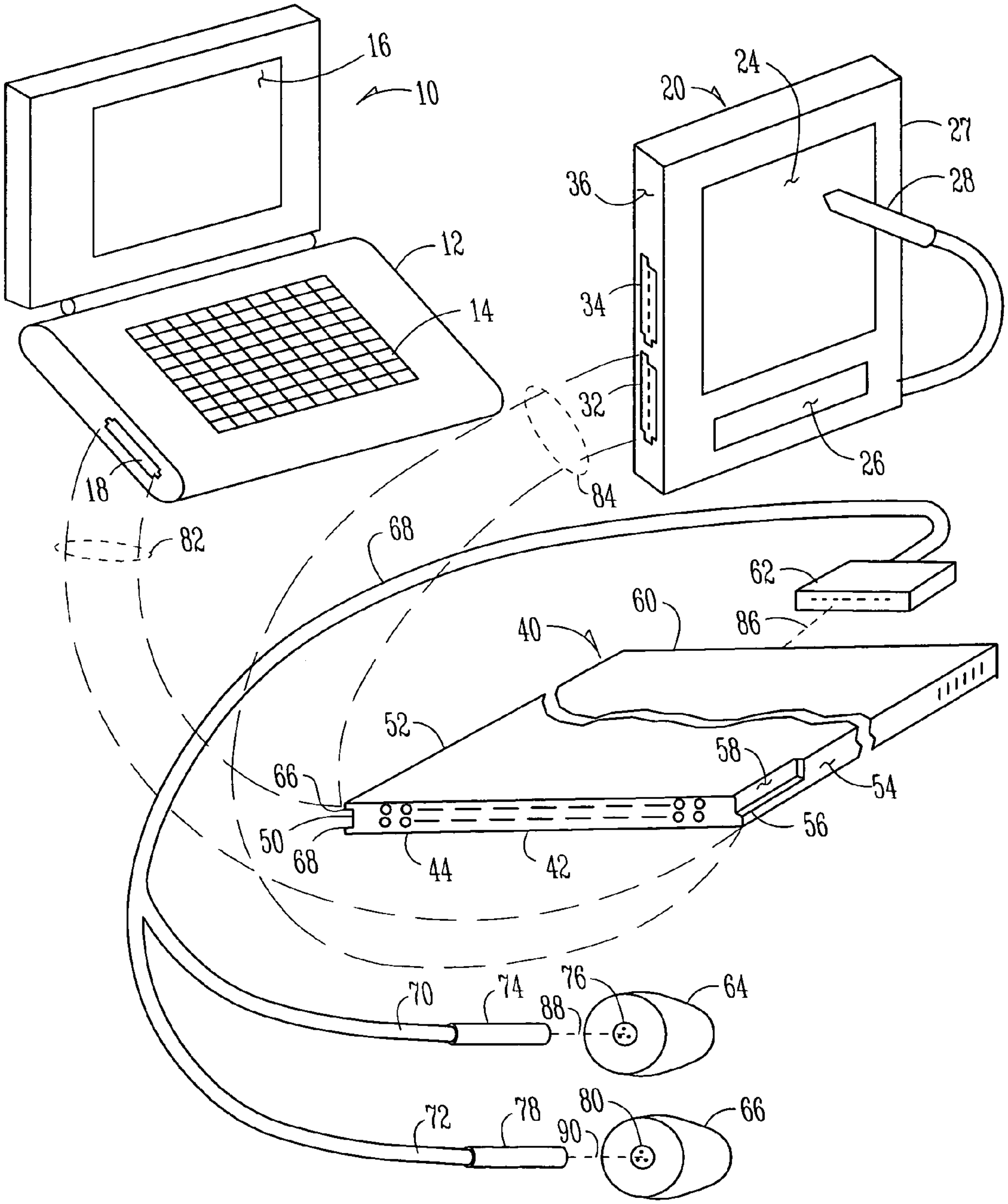
FIG. 1 is a pictorial view of an improved hearing aid programming system of this invention.

It is generally known that a person's hearing loss is not normally uniform over the entire frequency spectrum of hearing. For example, in typical noise-induced hearing loss, that the hearing loss is greater at higher frequencies than at lower frequencies. The degree of hearing loss at various frequencies varies with individuals. The measurement of an individual's hearing ability can be illustrated by an audiogram. An audiologist, or other hearing health professionals, will measure an individual's perceptive ability for differing sound frequencies and differing sound amplitudes. A plot of the resulting information in an amplitude/frequency diagram will graphically represent the individual's hearing ability, and will thereby represent the individual's hearing loss as compared to an established range of normal hearing for individuals. In this regard, the audiogram represents graphically the particular auditory characteristics of the individual. Other types of measurements relating to hearing deficiencies may be made. For example, speech recognition scores can be utilized. It is understood that the auditory characteristics of an individual or other measured hearing responses may be represented by data that can be represented in various tabular forms as well as in the graphical representation.

Basically a hearing aid consists of a sound actuatable microphone for converting environmental sounds into an electrical signal. The electrical signal is supplied to an amplifier for providing an amplified output signal. The amplified output signal is applied to a receiver that acts as a loudspeaker for converting the amplified electrical signal into sound that is transmitted to the individual's ear. The various kinds of hearing aids can be configured to be "completely in the canal" known as the CIC type of hearing aid. Hearing aids can also be embodied in configurations such as "in the ear", "in the canal", "behind the ear", embodied in an eyeglass frame, worn on the body, and surgically implanted. Each of the various types of hearing aids have differing functional and aesthetic characteristics.

Since individuals have differing hearing abilities with respect to each other, and oftentimes have differing hearing abilities between the right and left ears, it is normal to have some form of adjustment to compensate for the characteristics of the hearing of the individual. It has been known to provide an adjustable filter for use in conjunction with the amplifier for modifying the amplifying characteristics of the hearing aid. Various forms of physical adjustment for adjusting variable resistors or capacitors have been used. With the advent of microcircuitry, the ability to program hearing aids has become well-known. A programmable hearing aid typically has a digital control section and a signal processing section. The digital control section is adapted to store an auditory parameter, or a set of auditory parameters, which will control an aspect or set of aspects of the amplifying characteristics, or other characteristics, of the hearing aid. The signal processing section of the hearing aid then will operate in response to the control section to perform the actual signal processing, or amplification, it being understood that the signal processing may be digital or analog.

Numerous types of programmable hearing aids are known. As such, details of the specifics of programming functions will not be described in detail. To accomplish the programming, it has been known to have the manufacturer establish a computer-based programming function at its factory or outlet centers. In this form of operation, the details of the individual's hearing readings, such as the audiogram, are forwarded to the manufacturer for use in making the programming adjustments. Once adjusted, the hearing aid or hearing aids are then sent to the intended user. Such an operation clearly suffers from the disadvantage of the loss of time in the transmission of the information and the return of the adjusted hearing aid, as well as not being able to provide inexpensive and timely adjustments with the individual user. Such arrangements characteristically deal only with the programming of the particular manufacturer's hearing aids, and are not readily adaptable for adjusting or programming various types of hearing aids.

Yet another type of prior art programming system is utilized wherein the programming system is located near the hearing health professional who would like to program the hearing aid for patients. In such an arrangement, it is common for each location to have a general purpose computer especially programmed to perform the programming function and provide it with an interface unit hard-wired to the computer for providing the programming function to the hearing aid. In this arrangement, the hearing professional enters the audiogram or other patient-related hearing information into the computer, and thereby allows the computer to calculate the auditory parameters that will be optimal for the predetermined listening situations for the individual. The computer then directly programs the hearing aid. Such specific programming systems and hard-wired interrelationship to the host computer are costly and do not lend themselves to ease of altering the programming functions.

Other types of programming systems wherein centralized host computers are used to provide programming access via telephone lines and the like are also known, and suffer from many of the problems of cost, lack of ease of usage, lack of flexibility in reprogramming, and the like.

A number of these prior art programmable systems have been identified above, and their respective functionalities will not be further described in detail.

The system and method of programming hearing aids of the present invention provides a mechanism where all of the hearing aid programming system can be economically located at the office of each hearing health professional, thereby overcoming many of the described deficiencies of prior art programming systems.

A group of computing devices, including lap top computers, notebook computers, hand-held computers, such as the APPLE® NEWTON®, and the like, which can collectively be referenced as host computers are adapted to support the Personal Computer Memory Card International Association Technology, and which is generally referred to as PCMCIA. In general, PCMCIA provides one or more standardized ports in the host computer where such ports are arranged to cooperate with associated PCMCIA PC cards, hereinafter referred to as "Cards". The Cards are utilized to provide various functions, and the functionality of PCMCIA will be described in more detail below. The PCMCIA specification defines a standard for integrated circuit Cards to be used to promote interchangeability among a variety of computer and electronic products. Attention is given to low cost, ruggedness, low power consumption, light weight, and portability of operation.

The specific size of the various configurations of Cards will be described in more detail below, but in general, it is understood that it will be comparable in size to credit cards, thereby achieving the goal of ease of handling. Other goals of PCMCIA technology can be simply stated to require that (1) it must be simple to configure, and support multiple peripheral devices; (2) it must be hardware and operating environment independent; (3) installation must be flexible; and (4) it must be inexpensive to support the various peripheral devices. These goals and objectives of PCMCIA specification requirements and available technology are consistent with the goals of this invention of providing an improved highly portable, inexpensive, adaptable hearing aid programming system. The PCMCIA technology is expanding into personal computers and work stations, and it is understood that where such capability is present, the attributes of this invention are applicable. Various aspects of PCMCIA will be described below at points to render the description meaningful to the invention.

FIG. 1 is a pictorial view of an improved hearing aid programming system of this invention. A host computer 10, which can be selected from among lap top computers; notebook computers, personal computers; work station computers; or the like, includes a body portion 12, a control keyboard portion 14, and a display portion 16. While only one PCMCIA port 18 is illustrated, it is understood that such ports may occur in pairs. Various types of host computers 10 are available commercially from various manufacturers, including, but not limited to, International Business Machines and Apple Computer, Inc. Another type of host computer is the hand-held computer 20 such as the APPLE® NEWTON®, or equivalent. The hand-held host 20 includes a body portion 22, a screen portion 24, a set of controls 26 and a stylus 28. The stylus 28 operates as a means for providing information to the hand-held host computer 20 by interaction with screen 24. A pair of PCMCIA ports 32 and 34 are illustrated aligned along one side 36 of the hand-held host computer 20. Again, it should be understood that more or fewer PCMCIA ports may be utilized. Further, it will be understood that it is possible for the PCMCIA ports to be position in parallel and adjacent to one another as distinguished from the linear position illustrated. A hand-held host computer is available from various sources, such as the Newton model available from Apple Computer, Inc.

A PCMCIA Card 40 has a first end 42 in which a number of contacts 44 are mounted. In the standard, the contacts 44 are arranged in two parallel rows and number sixty-eight contacts. The outer end 60 has a connector (not shown in this figure) to cooperate with mating connector 62. This interconnection provide signals to and from hearing aids 64 and 66 via cable 68 which splits into cable ends 70 and 72. Cable portion 70 has connector 74 affixed thereto and adapted for cooperation with jack 76 in hearing aid 64. Similarly, cable 72 has connector 78 that is adapted for cooperation with jack 80 in hearing aid 66. This configuration allows for programming of hearing aid 64 and 66 in the ears of the individual to use them, it being understood that the cable interconnection may alternatively be a single cable for a single hearing aid or two separate cables with two separations to the Card 40.

It is apparent that card 40 and the various components are not shown in scale with one another, and that the dashed lines represent directions of interconnection. In this regard, a selection can be made between portable host 10 or hand-held host 20. If host 10 is selected, card 40 is moved in the direction of dashed lines 82 for insertion in PCMCIA slot 18. Alternatively, if a hand-held host 20 is to be used, Card 40 is moved along dashed lines 84 for insertion in PCMCIA slot 32. Connector 62 can be moved along dashed line 86 for mating with the connector (not shown) at end 60 of card 40. Connector 74 can be moved along line 88 for contacting jack 76, and connector 78 can be moved along dashed line 90 for contacting jack 80. There are three standardized configurations of Card 40 plus one nonstandard form that will not be described.

Figure 2:
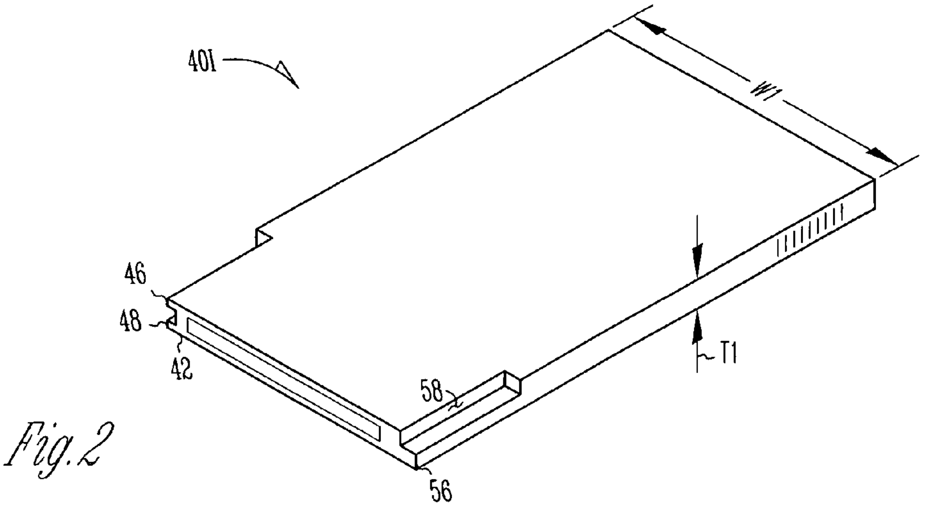
FIG. 2 is a perspective view of a Type I plug-in Card.

FIG. 2 is a perspective view of a Type I plug-in Card. The physical configurations and requirements of the various Card types are specified in the PCMCIA specification to assure portability and consistency of operation. Type I Card 40I has a width W1 of 54 millimeters and a thickness T1 of 3.3 millimeters. Other elements illustrated bear the same reference numerals as in FIG. 1.

Figure 3:
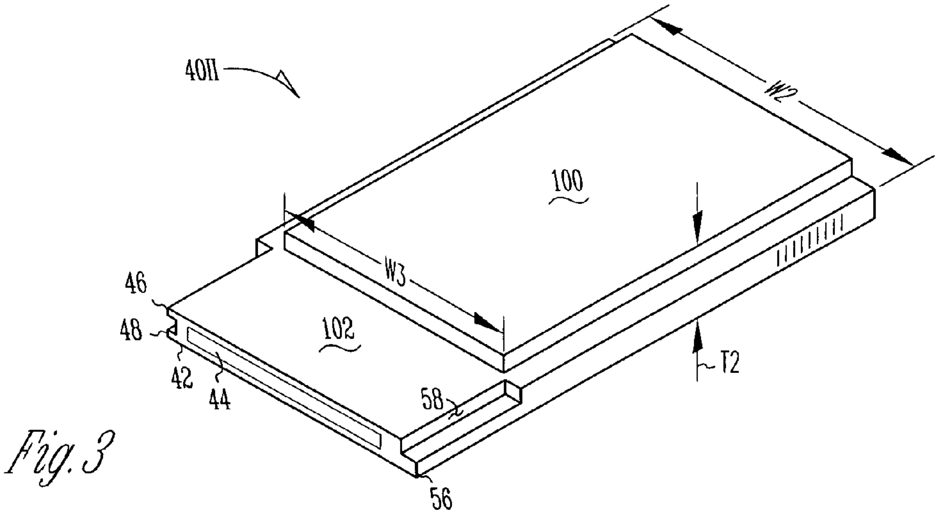
FIG. 3 is a perspective view of a Type II plug-in Card.

FIG. 3 is a perspective view of a Type II plug-in Card. Card 40II has a width W2 of 54 millimeters and has a raised portion 100. With the raised portion, the thickness T2 is 5.0 millimeters. The width W3 of raised portion 100 is 48 millimeters. The purpose of raised portion 100 is to provide room for circuitry to be mounted on the surface 102 of card 40II.

Figure 4:
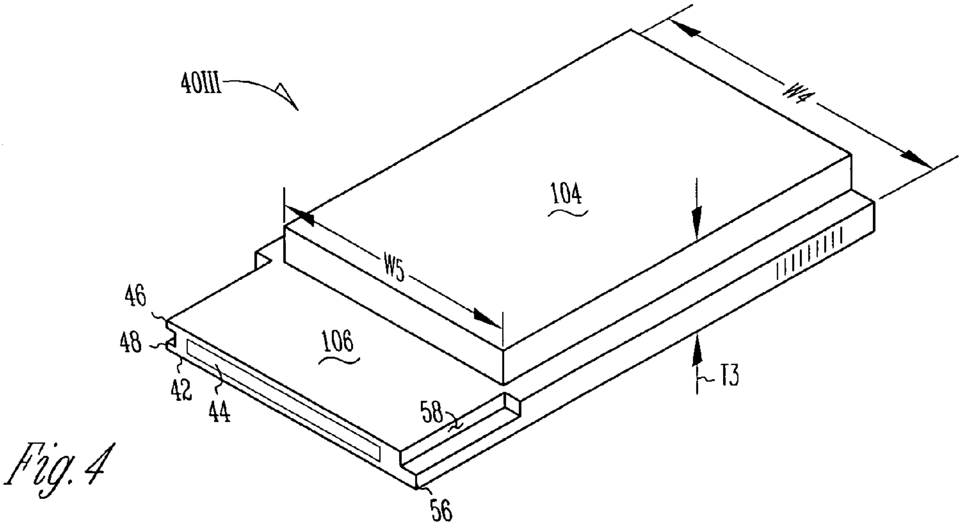
FIG. 4 is a perspective view of a Type III plug-in Card.

FIG. 4 is a perspective view of a Type III plug-in Card. Card 40III has a width W4 of 54 millimeters, and an overall thickness T3 of 10.5 millimeters. Raised portion 104 has a width W5 of 51 millimeters, and with the additional depth above the upper surface 106 allows for even larger components to be mounted.

Type II Cards are the most prevalent in usage, and allow for the most flexibility in use in pairs with stacked PCMCIA ports.

The PCMCIA slot includes two rows of 34 pins each. The connector on the Card is adapted to cooperate with these pins. There are three groupings of pins that vary in length. This results in a sequence of operation as the Card is inserted into the slot. The longest pins make contact first, the intermediate length pins make contact second, and the shortest pins make contact last. The sequencing of pin lengths allow the host system to properly sequence application of power and ground to the Card. It is not necessary for an understanding of the invention to consider the sequencing in detail, it being automatically handled as the Card is inserted. Functionally, the shortest pins are the card detect pins and are responsible for routing signals that inform software running on the host of the insertion or removal of a Card. The shortest pins result in this operation occurring last, and functions only after the Card has been fully inserted. It is not necessary for an understanding of the invention that each pin and its function be considered in detail, it being understood that power and ground is provided from the host to the Card.

Figure 5:
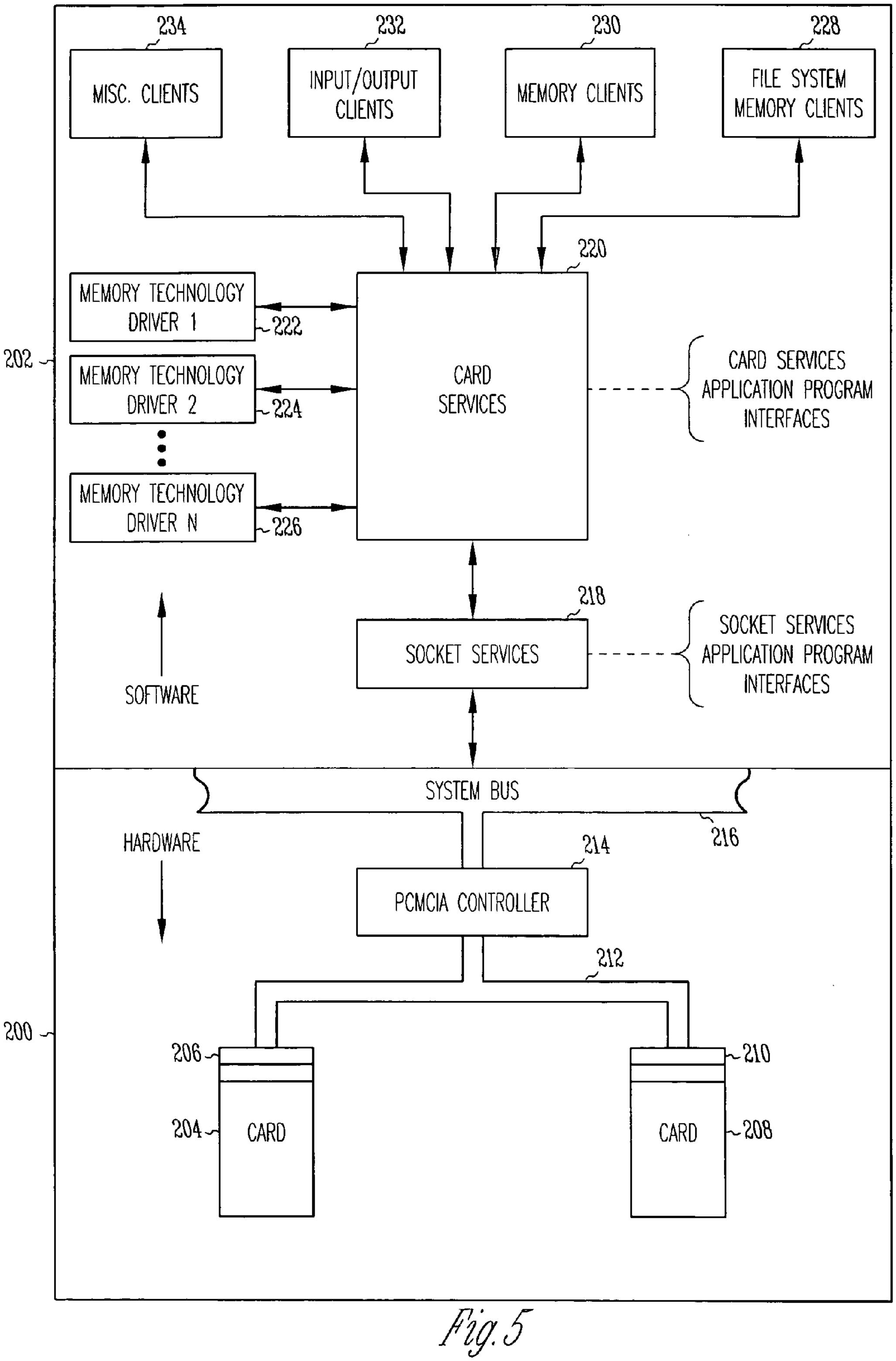
FIG. 5 is a diagram representing the PCMCIA architecture.

FIG. 5 is a diagram representing the PCMCIA architecture. The PCMCIA architecture is well-defined and is substantially available on any host computer that is adapted to support the PCMCIA architecture. For purposes of understanding the invention, it is not necessary that the intricate details of the PCMCIA architecture be defined herein, since they are substantially available in the commercial marketplace. It is, however, desirable to understand some basic fundamentals of the PCMCIA architecture in order to appreciate the operation of the invention.

In general terms, the PCMCIA architecture defines various interfaces and services that allow application software to configure Card resources into the system for use by system-level utilities and applications. The PCMCIA hardware and related PCMCIA handlers within the system function as enabling technologies for the Card.

Resources that are capable of being configured or mapped from the PCMCIA bus to the system bus are memory configurations, input/output (I/O) ranges and Interrupt Request Lines (IRQs). Details concerning the PCMCIA architecture can be derived from the specification available from PCMCIA Committee, as well as various vendors that supply PCMCIA components or software commercially.

The PCMCIA architecture involves a consideration of hardware 200 and layers of software 202. Within the hardware consideration, Card 204 is coupled to PCMCIA socket 206 and Card 208 is coupled to PCMCIA socket 210. Sockets 206 and 210 are coupled to the PCMCIA bus 212 which in turn is coupled to the PCMCIA controller 214. Controllers are provided commercially by a number of vendors. The controller 214 is programmed to carry out the functions of the PCMCIA architecture, and responds to internal and external stimuli. Controller 214 is coupled to the system bus 216. The system bus 216 is a set of electrical paths within a host computer over which control signals, address signals, and data signals are transmitted. The control signals are the basis for the protocol established to place data signals on the bus and to read data signals from the bus. The address lines are controlled by various devices that are connected to the bus and are utilized to refer to particular memory locations or I/O locations. The data lines are used to pass actual data signals between devices.

The PCMCIA bus 212 utilizes 26 address lines and 16 data lines.

Within the software 202 consideration, there are levels of software abstractions. The Socket Services 218 is the first level in the software architecture and is responsible for software abstraction of the PCMCIA sockets 206 and 210. In general, Socket Services 218 will be applicable to a particular controller 214. In general, Socket Services 218 uses a register set (not shown) to pass arguments and return status. When interrupts are processed with proper register settings, Socket Services gains control and attempts to perform functions specified at the Application Program Interfaces (API).

Card Services 220 is the next level of abstraction defined by PCMCIA and provides for PCMCIA system initialization, central resource management for PCMCIA, and APIs for Card configuration and client management. Card Services is event-driven and notifies clients of hardware events and responds to client requests. Card Services 220 is also the manager of resources available to PCMCIA clients and is responsible for managing data and assignment of resources to a Card. Card Services assigns particular resources to Cards on the condition that the Card Information Structure (CIS) indicates that they are supported. Once resources are configured to a Card, the Card can be accessed as if it were a device in the system. Card Services has an array of Application Program Interfaces to provide the various required functions.

Memory Technology Driver 1 (MTD) 222, Memory Technology Driver 2, label 224, and Memory Technology Driver N, label 226, are handlers directly responsible for reading and writing of specific memory technology memory Cards. These include standard drivers and specially designed drivers if required.

Card Services 220 has a variety of clients such as File System Memory clients 228 that deal with file system aware structures; Memory Clients 230, Input/Output Clients 232; and Miscellaneous Clients 234.

Figure 6:
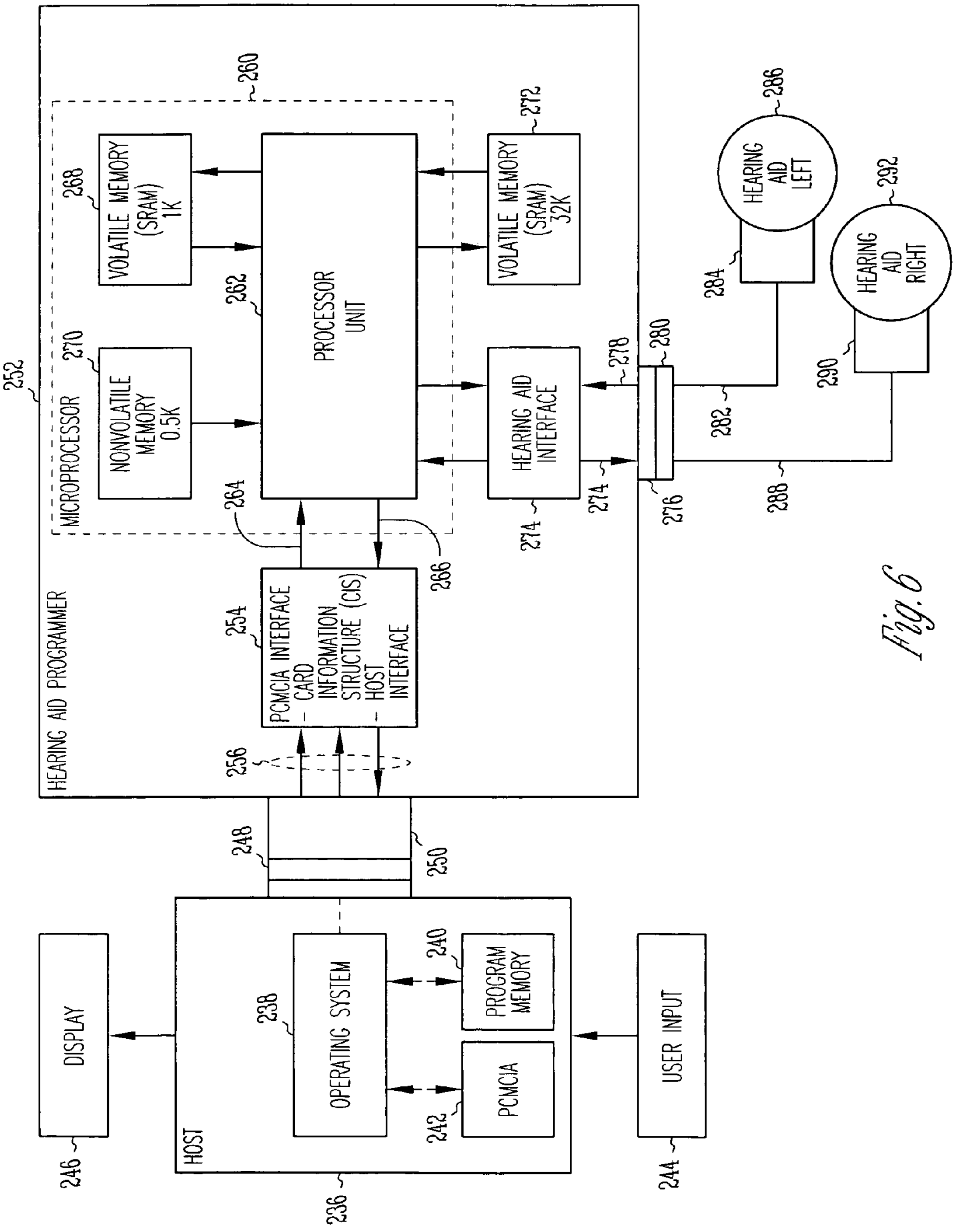
FIG. 6 is a block diagram illustrating the functional interrelationship of a host computer and the Card used for programming hearing aids.

FIG. 6 is a block diagram illustrating the functional interrelationship of a host computer and a Card used for programming hearing aids. A Host 236 has an Operating System 238. A Program Memory 240 is available for storing the hearing aid programming software. The PCMCIA block 242 indicates that the Host 236 supports the PCMCIA architecture. A User Input 244 provides input control to Host 236 for selecting hearing aid programming functions and providing data input to Host 236. A Display 246 provides output representations for visual observation. PCMCIA socket 248 cooperates with PCMCIA jack 250 mounted on Card 252.

On Card 252 there is a PCMCIA Interface 254 that is coupled to jack 250 via lines 256, where lines 256 include circuits for providing power and ground connections from Host 236, and circuits for providing address signals, data signals, and control signals. The PCMCIA Interface 254 includes the Card Information Structure (CIS) that is utilized for providing signals to Host 236 indicative of the nature of the Card and setting configuration parameters. The CIS contains information and data specific to the Card, and the components of information in CIS is comprised of tuples, where each tuple is a segment of data structure that describes a specific aspect or configuration relative to the Card. It is this information that will determine whether the Card is to be treated as a standard serial data port, a standard memory card, a unique programming card or the like. The combination of tuples is a metaformat.

A Microprocessor shown within dashed block 260 includes a Processor Unit 262 that receives signals from PCMCIA Interface 254 over lines 264 and provides signals to the Interface over lines 266. An onboard memory system 268 is provided for use in storing program instructions. In the embodiment of the circuit, the Memory 268 is a volatile static random access memory (SRAM) unit of 1K capacity. A Nonvolatile Memory 370 is provided. The Nonvolatile Memory is 0.5K and is utilized to store initialization instructions that are activated upon insertion of Card 352 into socket 348.

This initialization software is often referred to as "bootstrap" software in that the system is capable of pulling itself up into operation.

A second Memory System 272 is provided. This Memory is coupled to Processor Unit 262 for storage of hearing aid programming software during the hearing aid programming operation. In a preferred embodiment, Memory 272 is a volatile SRAM having a 32K capacity. During the initialization phases, the programming software will be transmitted from the Program Memory 240 of Host 236 and downloaded through the PCMCIA interface 254. In an alternative embodiment, Memory System 272 can be a nonvolatile memory with the hearing aid programming software stored therein. Such nonvolatile memory can be selected from available memory systems such as Read Only Memory (ROM), Programmable Read Only Memory (PROM), Erasable Programmable Read Only Memory (EPROM), or Electrically Erasable Programmable Read Only Memory (EEPROM). It is, of course, understood that Static Random Access Memory (SRAM) memory systems normally do not hold or retain data stored therein when power is removed.

A Hearing Aid Interface 274 provides the selected signals over lines 274 to the interface connector 276. The Interface receives signals on lines 278 from the interface connector. In general, the Hearing Aid Interface 274 functions under control of the Processor Unit 262 to select which hearing aid will be programmed, and to provide the digital to analog selections, and to provide the programmed impedance levels.

A jack 280 couples with connector 276 and provides electrical connection over lines 282 to jack 284 that couples to hearing aid 286. In a similar manner, conductors 288 coupled to jack 290 for making electrical interconnection with hearing aid 292.

Assuming that Socket Services 218, Card Services 220 and appropriate drivers and handlers are appropriately loaded in the Host 236, the hearing aid programming system is initialized by insertion of Card 252 into socket 248. The insertion processing involves application of power signals first since they are connected with the longest pins. The next longest pins cause the data, address and various control signals to be made. Finally, when the card detect pin is connected, there is a Card status change interrupt. Once stabilized, Card Services queries the status of the PCMCIA slot through the Socket Services, and if the state has changed, further processing continues. At this juncture, Card Services notifies the I/O clients which in turn issues direction to Card Services to read the Card's CIS. The CIS tuples are transmitted to Card Services and a determination is made as to the identification of the Card 252 and the configurations specified. Depending upon the combination of tuples, that is, the metaformat, the Card 252 will be identified to the Host 236 as a particular structure. In a preferred embodiment, Card 252 is identified as a serial memory port, thereby allowing Host 236 to treat with data transmissions to and from Card 252 on that basis. It is, of course, understood that Card 252 could be configured as a serial data Card, a Memory Card or a unique programming Card thereby altering the control and communication between Host 236 and Card 252.

Figure 7:
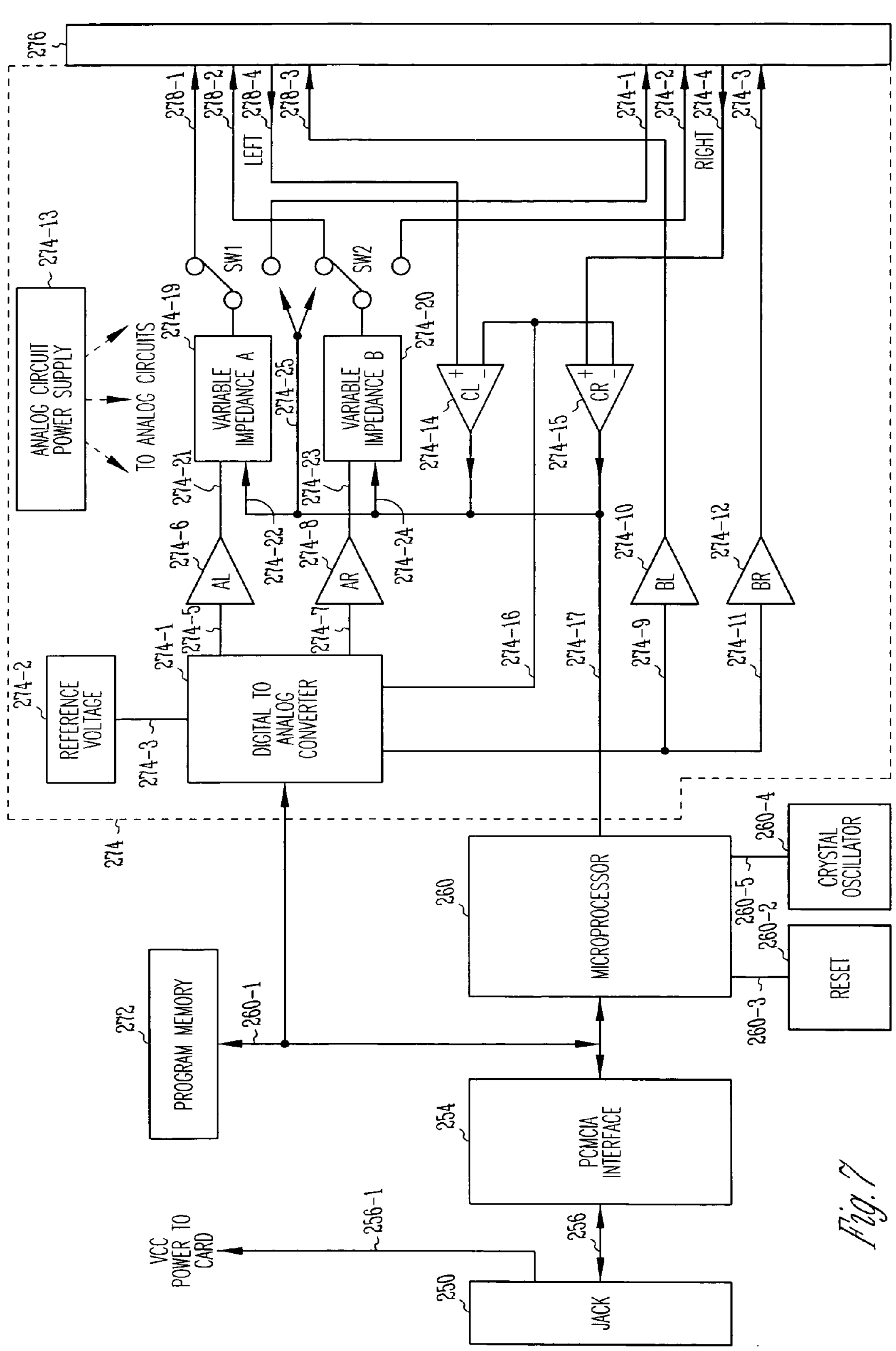
FIG. 7 is a functional block diagram of the hearing aid programming Card.

FIG. 7 is a functional block diagram of the hearing aid programming Card.

The PCMCIA jack 250 is coupled to PCMCIA Interface 254 via PCMCIA bus 256, and provides VCC power to the card via line 256-1. The Microprocessor 260 is coupled to the Program Memory 272 via the Microprocessor Bus 260-1. A Reset Circuit 260-2 is coupled via line 260-3 to Microprocessor 260 and functions to reset the Microprocessor when power falls below predetermined limits. A Crystal Oscillator 260-4 is coupled to Microprocessor 260 via line 260-5 and provides a predetermined operational frequency signal for use by Microprocessor 260.

The Hearing Aid Interface shown enclosed in dashed block 274 includes a Digital to Analog Converter 274-1 that is coupled to a Reference Voltage 274-2 via line 274-3. In a preferred embodiment, the Reference Voltage is established at 2.5 volts DC. Digital to Analog Converter 274-1 is coupled to Microprocessor Bus 260-1. The Digital to Analog Converter functions to produce four analog voltages under control of the programming established by the Microprocessor.

One of the four analog voltages is provided on Line 274-5 to amplifier AL, labeled 274-6, which functions to convert 0 to reference voltage levels to 0 to 15 volt level signals. A second voltage is provided on line 274-7 to amplifier AR, labeled 274-8, which provides a similar conversion of 0 volts to the reference voltage signals to 0 volts to 15 volt signals. A third voltage is provided on line 274-9 to the amplifier BL, labeled 274-10, and on line 274-11 to amplifier BR, labeled 274-12. Amplifiers BL and BR convert 0 volt signals to reference voltage signals to 0 volts to 15 volt signals and are used to supply power to the hearing aid being adjusted. In this regard, amplifier BL provides the voltage signals on line 278-3 to the Left hearing aid, and amplifier BR provides the selected voltage level signals on line 274-3 to the Right hearing aid.

An Analog Circuit Power Supply 274-13 provides predetermined power voltage levels to all analog circuits.

A pair of input Comparators CL labeled 274-14 and CR labeled 274-15 are provided to receive output signals from the respective hearing aids. Comparator CL receives input signals from the Left hearing aid via line 278-4 and Comparator CR receives input signals from the Right hearing aid via line 274-4. The fourth analog voltage from Digital to Analog Converter 274-1 is provided on line 274-16 to Comparators CL and CR.

A plurality of hearing aid programming circuit control lines pass from Microprocessor 260 and to the Microprocessor via lines 274-17. The output signals provided by comparators CL and CR advise Microprocessor 260 of parameters concerning the CL and CR hearing aids respectively.

A Variable Impedance A circuit and Variable Impedance B circuit 274-20 each include a predetermined number of analog switches and a like number of resistance elements. In a preferred embodiment as will be described in more detail below, each of these circuits includes eight analog switches and eight resistors. The output from amplifier AL is provided to Variable Impedance A via line 274-21 and selection signals are provided via line 274-22. The combination of the voltage signal applied and the selection signals results in an output being provided to switch SW1 to provide the selected voltage level. In a similar manner, the output from Amplifier R is provided on line 274-23 to Variable Impedance B 274-20, and with control signals on line 274-24, results in the selected voltage signals being applied to switch SW2.

Switches SW1 and SW2 are analog switches and are essentially single pole double throw switches that are switched under control of signals provided on line 274-25. When the selection is to program the left hearing aid, switch SW1 will be in the position shown and the output signals from Variable Impedance A will be provided on line 278-1 to LF hearing aid. At the same time, the output from Variable Impedance B 274-20 will be provided through switch SW2 to line 278-2. When it is determined that the Right hearing aid is to be programmed, the control signals on line 274-25 will cause switches SW1 and SW2 to switch. This will result in the signal from Variable Impedance A to be provided on line 274-1, and the output from Variable Impedance B to be provided on line 274-2 to the Right hearing aid.

With the circuit elements shown, the program that resides in Program Memory 272 in conjunction with the control of Microprocessor 260 will result in application of data and control signals that will read information from Left and Right hearing aids, and will cause generation of the selection of application and the determination of levels of analog voltage signals that will be applied selectively the Left and Right hearing aids. A more detailed circuit diagram of the functional elements will be set forth below.

Since the introduction of a product based on the foregoing technology it has become desirable to provide a more universal device which is not limited to communication via a PCMCIA card, but is able to communicate via one or more communication protocols. It has also become desirable to provide electrical isolation between the patient and the host computer. Both of these features are provided by the embodiments discussed below in connection with FIGS. 8–10.

Figure 8:
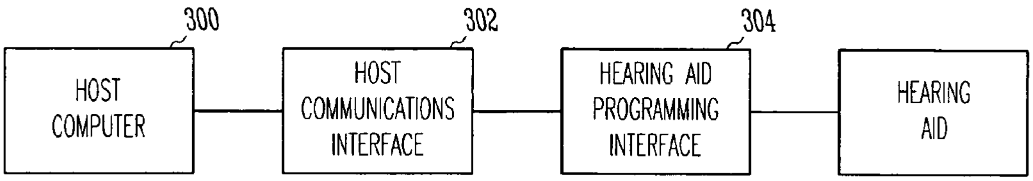
FIG. 8 is a block diagram of an alternate embodiment of the hearing aid programming system.

Referring to FIG. 8, a host computer 300 is provided with a first communication interface 302 which communicates with a hearing aid programming interface device 304, which in turn programs hearing aids 64 and 66. The host computer 300 may be any type of computer, as discussed above. The first communication interface 302 may be any type of interface such as PCMCIA, USB, RS-232, SCSI or IEEE 1394 (Firewire), all of which are well known and standard communication interfaces in the PC industry. The program communicates with the hearing aid programming interface device 304 via the first interface 302 to program the hearing aid. The use of the hearing aid programming interface device 304 allows communication with a much wider pool of host computers since it can communicate with any desired interface. Interface device 304 is provided with any standard communication interface, such as PCMCIA, USB, RS-232, SCSI or IEEE 1394 (Firewire), and may also be configured to communicate wirelessly with the host computer 300. In the preferred embodiment, interface device 304 is provided with two or more interfaces to allow a single interface device 304 to communicate with a host computer equipped with any desired port. For example, the interface device 304 could be provided with PCMCIA and USB interfaces, although these interfaces are discussed in more detail below in stand alone embodiments.

In the preferred embodiment, the programming software consists of three components: the application software that the user sees, a DLL that controls the programming interface, and embedded software for the microprocessor contained within the programming interface.

In the preferred embodiment, and as discussed above in connection with the initialization phase of the PCMCIA interface, the embedded software is downloaded from the host computer 300 to the interface device 304 upon initialization or power-up. Because the embedded software is downloaded from the host computer each time the system is initialized or powered up, upgrades to the embedded software are easy to implement. In the preferred embodiment, the embedded software takes the form of a DLL file stored on a hard disk of the host computer 300. The upgraded programming is simply copied over the old DLL file, and the newer version will automatically be downloaded to the interface device 304 upon initialization or power-up. This also allows the interface device to be used easily in connection with hearing aids sold by multiple manufacturers, since separate DLL files for programming different hearing aids can be provided for downloading to the interface device 304.

Figure 9:
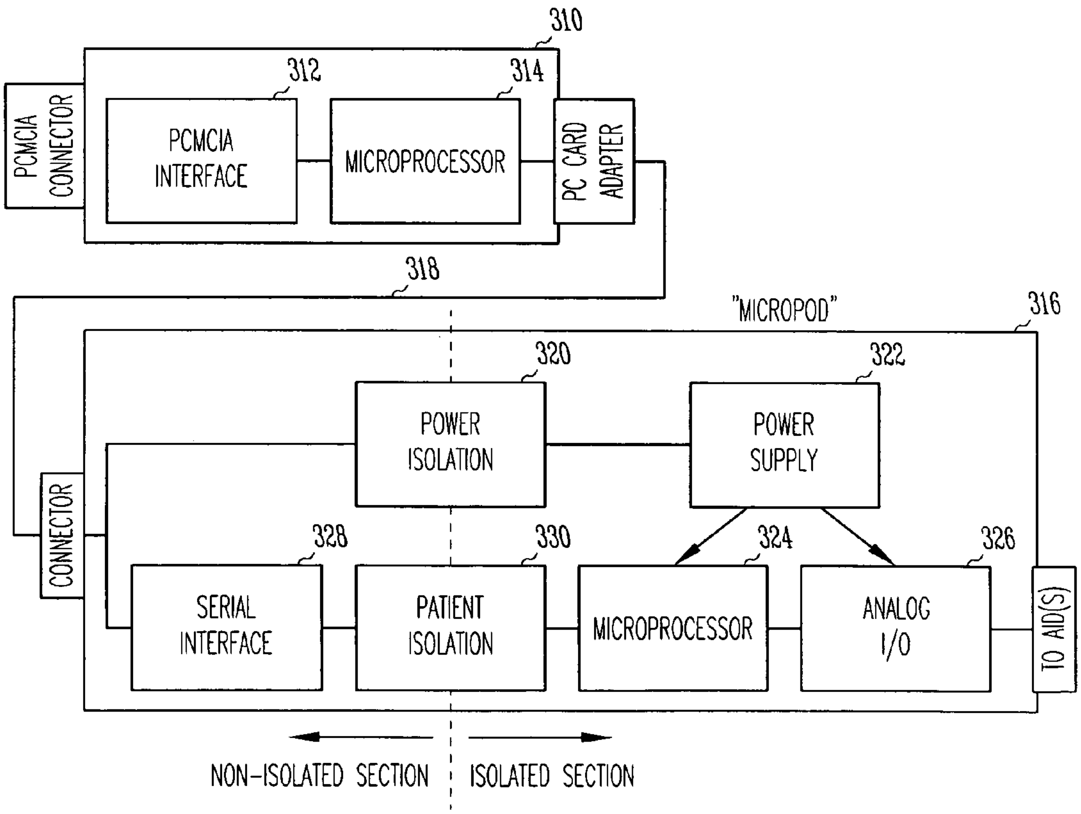
FIG. 9 is a more detailed block diagram of a PCMCIA alternate embodiment of the hearing aid programming system.

Referring to FIG. 9, the first communication interface 302 consists of a PC card adaptor 310 which plugs into a host computer PCMCIA card connector. Adaptor 310 includes a PCMCIA interface chip 312 and microprocessor 314. As discussed above, the PCMCIA interface chip 312 contains circuitry to translate PCMCIA bus signals into a serial signal suitable for transmission across a cable. The microprocessor 314 configures the PCMCIA interface on power-up by downloading the DLL to a memory in microprocessor block 324. Adaptor 310 could also eliminate the need for a microprocessor to configure the PCMCIA interface by using an ASIC or FPGA chip as the PCMCIA interface.

The adaptor 310 is connected to the hearing aid programming interface 316 device via cable 318. Power is provided to the interface 316 from the host computer (see FIG. 8). Power isolation is provided at 320 by a DC-DC converter, which converts an input voltage into an output voltage and provides electrical isolation between the input and the output. The DC-DC converter 320 drives the power supply 322, which in turn supplies power to microprocessor 324 and the analog I/O circuitry 326. DC-DC converters are commercially available from Power Convertibles Inc. The serial interface 328 is a simple logic level driver and receiver which interfaces to the serial signals sent by and received by the PCMCIA adaptor 310. The control and data signals received by interface 316 are electrically isolated from the patient hearing aid by patient isolation circuitry 330, which consists of optoisolators which convert the input electrical signal to an optical signal, then back to an electrical output signal to electrically isolate the patient from the host computer. Optoisolators are well known in the art and are commercially available from Hewlett Packard. The analog I/O circuitry of 326 is the same as discussed in the earlier embodiments above.

Figure 10:
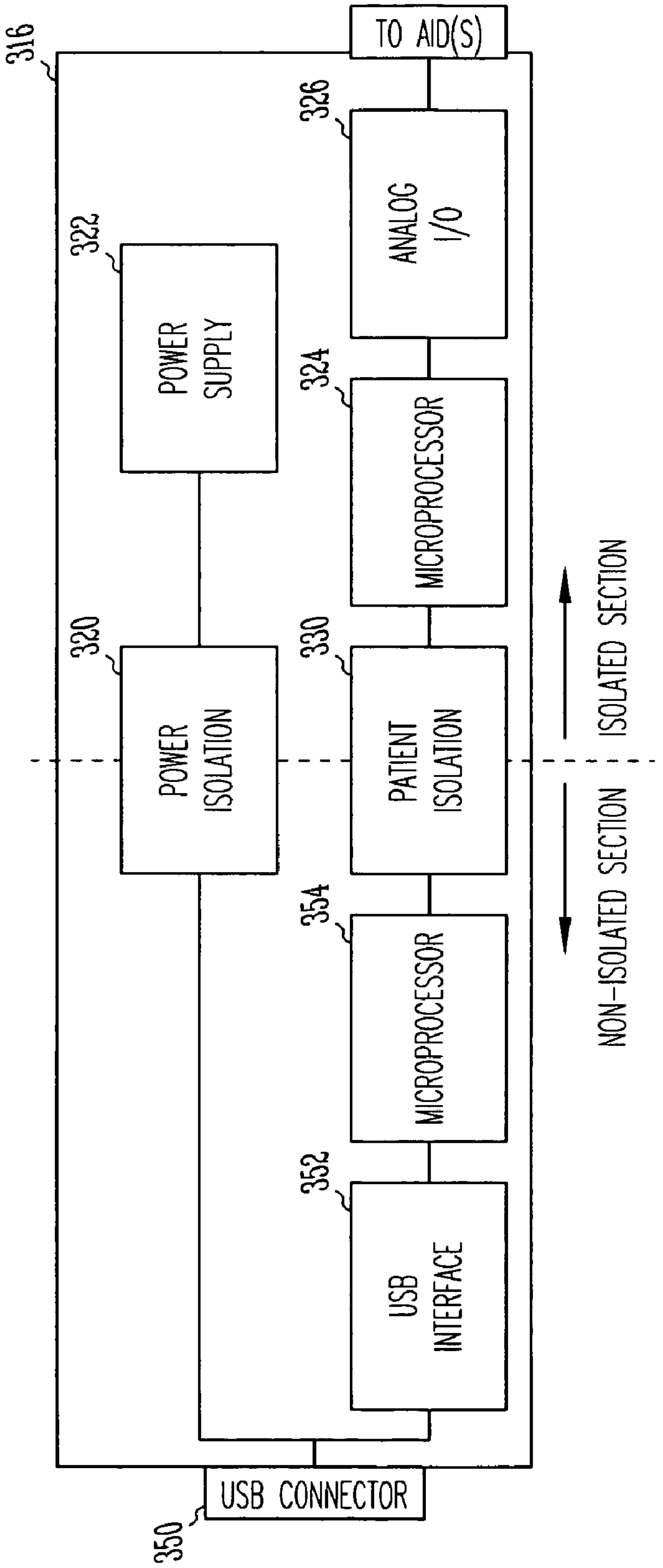
FIG. 10 is a more detailed block diagram of a USB alternate embodiment of the hearing aid programming system.

Referring now to FIG. 10, a USB version of the hearing aid programming system is shown which connects directly to the USB port of a host computer via USB connector 350. The USB connection to the host computer provides power as well as the data and control signals to the hearing aid programming interface 316. The USB interface 316 is similar to that shown in FIG. 9, substituting USB interface chip 352 driven by microprocessor 354 for the serial interface 328. USB interface chips are commercially available from several companies, including Intel and Cypress.

Electrical isolation could also be provided by utilizing a wireless embodiment of FIG. 8 in which the host computer first interface is a wireless transmitter/receiver and the patient isolation block 330 of FIG. 9 is replaced with a wireless transmitter/receiver device. These wireless transmitter/receiver devices are commercially available from several companies, including Link Technologies and Digital Wireless Corporation. In the wireless version, interface 316 would contain a battery to provide power to interface 316.

Figure 11:
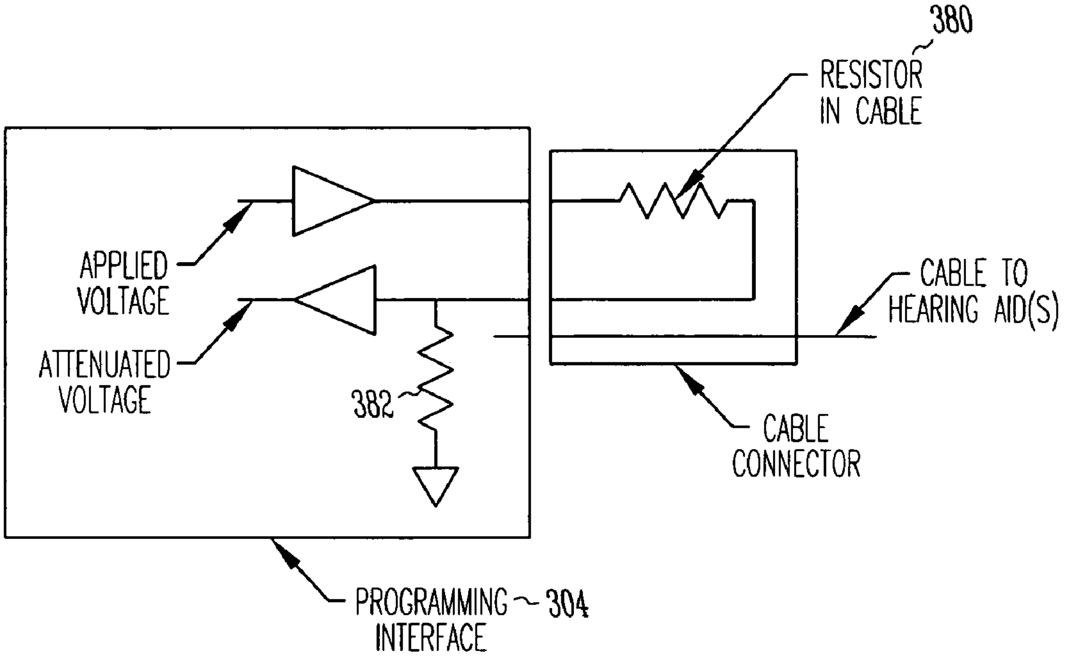
FIG. 11 is a circuit diagram for cable identification.

Another improvement is the ability of the interface 304 to detect the type of hearing aid attached and verify it is programmed correctly to program that particular type of hearing aid. This can be done by selectively shorting 2 or more pins in the cable connecting the hearing aid to the interface 304. This can be done by connecting multiple pins of the cable together with wires or other components so as to uniquely identify the cable type. For example, pairs of pins can be shorted together to identify the cable. In the preferred embodiement, resistors of different values are used. In this embodiment, the resistor in the cable and another resistor in the programming interface work together to form a voltage divider. This voltage divider is driven by a voltage source on one pin and the resulting attenuated voltage is measured on another pin. This resultant attenuation of the signal is used to infer the value of the resistor in the cable. Many different values of resistors are possible, each one corresponding to a particular cable type. This embodiement can be seen with reference to FIG. 11, in which resistor 380 is in the cable and resistor 382 is in the programming interface 304, and these 2 resistors are connected to 2 pins on the cable to the hearing aid(s). The inferred value of resistor 380 may be used as an entry point for a look-up table which identifies the cable type.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended Claims.

What is claimed is:

1. A hearing aid programming system for programming at least one hearing aid, comprising:

a host computer; and a hearing aid programming device having a first interface removably connected to the host computer and a second interface adapted for removable connection to a hearing aid, the hearing aid programming device including a memory that stores a program for programming a hearing aid, and the hearing aid programming device receiving user input from the host computer to perform a programming operation based on the program, the hearing aid programming device including software configured as a dynamic link library (DLL) file, the dynamic link library (DLL) file adapted to control the hearing aid programming device; and wherein the hearing aid programming device includes a third interface adapted to communicate with a computer.

2. The hearing aid programming system according to claim 1, wherein the third interface is adapted to connect to another host computer.

3. The hearing programming system according to claim 1, wherein the first interface is selected from the group consisting of PCMCIA, USB, RS 1394 or wireless.

4. The hearing aid programming system according to claim 1, wherein the memory that stores the program is a nonvolatile memory.

5. The hearing aid programming system according to claim 4, wherein the nonvolatile memory is one of a read only memory, a programmable read only memory, an erasable read only memory, and an electrically erasable programmable read only memory.

6. The hearing aid programming system according to claim 1, wherein the hearing aid programming device stores identification information, which is transmitted to the host computer upon powering the hearing aid programming device, to identify a communication protocol for the first interface.

7. The hearing aid programming system according to claim 6, wherein the communication protocol is serial communication.

8. The hearing aid programming system according to claim 1, wherein the hearing aid programming device includes a microprocessor producing programming signals based on the program stored in the memory of the hearing aid programming device and input from the host computer.

9. The hearing aid programming system according to claim 8, wherein the second interface includes a digital to analog converter that produces analog voltages under control of the microprocessor of the hearing aid programming device.

10. The hearing aid programming system according to claim 9, wherein the hearing aid programming device includes variable impedance circuits connected between the digital to analog convertor and the hearing aid.

11. The hearing aid programming system according to claim 10, wherein the hearing aid programming device includes comparators connected between the hearing aid and the microprocessor.

12. The hearing aid programming system according to claim 1, wherein the first interface is a PCMCIA interface and the third interface is a USB interface.

13. The hearing aid programming system according to claim 1, wherein the first interface is a USB interface and the third interface is a PCMCIA interface.

14. The hearing aid programming system according to claim 1, wherein the second interface further includes circuitry for electrically isolating a hearing aid from the host computer including at least one pair of optoisolators for sending and receiving data and control signals between the hearing aid programming device and the hearing aid to be programmed.

15. The hearing aid programming system according to claim 1, wherein the second interface includes a cable and a cable identification circuit for identification of the type of cable connecting the hearing aid to the hearing aid programming device.

16. The hearing aid programming system according to claim 1, wherein the first interface is a wireless interface, and the hearing aid programming device includes a battery.

17. The hearing aid programming system according to claim 16, wherein the wireless first interface communicates by one of infrared signals, radio frequency signals, and ultrasonic signals.

18. The hearing aid programming system according to claim 1, wherein the second interface includes circuitry for electrically isolating the hearing aid from both the host computer and the hearing aid programming device.

19. The hearing aid programming system according to claim 1, wherein the hearing aid programming device is a PCMCIA card.

20. The hearing aid programming system according to claim 1, wherein the host computer powers the hearing aid programming device.

21. The hearing aid programming system according to claim 1, wherein the first interface is selected from the group consisting of PCMCIA, USB, SCSI, and IEEE 1394, and the first interface sends and receives control and data signals.

22. The hearing aid programming system of claim 1, wherein the first interface is a PCMCIA interface which converts PCMCIA bus signals to and from serial bus signals, the PCMCIA interface being electrically connected to the hearing aid programming device.

23. The hearing aid programming system of claim 1, wherein the first interface is a USB interface which converts USB bus signals to and from serial bus signals, the USB interface being electrically connected to the hearing aid programming device.

24. The hearing aid programming system of claim 1, wherein the first interface is a SCSI interface which converts SCSI bus signals to and from serial bus signals, the SCSI interface being electrically connected to the hearing aid programming device.

25. The hearing aid programming system of claim 1, wherein the first interface is an IEEE 1394 interface which converts IEEE 1394 bus signals to and from serial bus signals, the IEEE 1394 interface being electrically connected to the hearing aid programming interface device.

26. The hearing aid programming system of claim 1, wherein the first interface is a wireless interface selected from the group consisting of infrared (IR), radio frequency (RF) or ultrasonic wireless communication interfaces.

27. The hearing aid programming system of claim 1, wherein at least one of the first interface and the second interface is a PCMCIA interface.

28. The hearing aid programming system of claim 1, wherein the first interface and the second interface are both PCMCIA interfaces.

29. A hearing aid programming system for programming at least one hearing aid, comprising:

a host computer;

a hearing aid programming device having a first interface removably connected to the host computer and a second interface adapted for removable connection to a hearing aid, the hearing aid programming device including a memory that stores a program for programming a hearing aid, and the hearing aid programming device receiving user input from the host computer to perform a programming operation based on the program, the hearing aid programming device including a third interface adapted to communicate with a computer, the hearing aid programming device including software configured as a dynamic link library (DLL) file, the dynamic link library (DLL) file adapted to control the hearing aid programming device; and wherein the first interface includes a conversion circuit that converts bus signals from the host computer to serial signals.

30. The system of claim 29, wherein the hearing aid programming device includes an isolation circuit connected between the first interface and the second interface.

31. The system of claim 30, wherein the isolation circuit includes a power isolation circuit.

32. The system of claim 30, wherein the isolation circuit includes a hearing aid signal isolation circuit.

33. The system of claim 32, wherein the hearing aid isolation circuit includes an opto-isolator.

34. The system of claim 32, wherein the hearing aid isolation circuit includes a wireless connection.

35. A hearing aid programming system for programming at least one hearing aid, comprising:

a host computer;

a hearing aid programming device having a first interface removably connected to the host computer and a second interface adapted for removable connection to a hearing aid, the hearing aid programming device including a memory that stores a program for programming a hearing aid, and the hearing aid programming device receiving user input from the host computer to perform a programming operation based on the program, the hearing aid programming device including software configured as a dynamic link library (DLL) file, the dynamic link library (DLL) file adapted to control the hearing aid programming device; and wherein the second interface includes a detection circuit that is adapted to detect the type of hearing aid to be programmed.

36. The hearing aid programming system of claim 35, wherein the detection circuit is configured to detect the type of hearing aid to be programmed by detecting a cable type for the hearing aid to be programmed.

37. The hearing aid programming system of claim 35, wherein the detection circuit includes a resistor configured to form a voltage divider with a resistor in a cable connected to the hearing aid to be programmed.

38. The hearing aid programming system of claim 35, wherein the memory is configured to receive multiple dynamic link library (DLL) files to program a plurality of hearing aids types.

39. The hearing aid programming system of claim 1, wherein the memory is configured to receive multiple dynamic link library (DLL) files to program a plurality of hearing aids types.

40. The hearing aid programming system of claim 29, wherein the memory is configured to receive multiple dynamic link library (DLL) files to program a plurality of hearing aids types.

* * * * *

UNITED STATES PATENT AND TRADEMARK OFFICE

CERTIFICATE OF CORRECTION

PATENT NO. : 7,054,957 B2
APPLICATION NO. : 09/795829
DATED : May 30, 2006
INVENTOR(S) : Armitage It is certified that error appears in the above-identified patent and that said Letters Patent is hereby corrected as shown below:

On Title Page Item 56, under “Foreign Patent Documents”, in column 2, line 1, after “11/1993” insert - - A61B 5/12 - -.

In column 15, line 15, in Claim 3, delete “RS” and insert - - RS-232, SCSI, IEEE - -, therefor.

Signed and Sealed this

Fifth Day of September, 2006

JON W. DUDAS
*Director of the United States Patent and Trademark Office*